United States Patent
Bade et al.

(10) Patent No.: US 7,786,643 B2
(45) Date of Patent: Aug. 31, 2010

(54) ELECTRICAL MACHINE, IN PARTICULAR A SYNCHRONOUS MOTOR, WITH REDUNDANT STATOR WINDINGS

(75) Inventors: Maria Bade, Berlin (DE); Axel Möhle, Berlin (DE)

(73) Assignee: Siemens Aktiengesellschaft, München (DE)

( * ) Notice: Subject to any disclaimer, the term of this patent is extended or adjusted under 35 U.S.C. 154(b) by 198 days.

(21) Appl. No.: 12/093,526

(22) PCT Filed: May 2, 2007

(86) PCT No.: PCT/EP2007/054244

§ 371 (c)(1),
(2), (4) Date: May 13, 2008

(87) PCT Pub. No.: WO2007/128747

PCT Pub. Date: Nov. 15, 2007

(65) Prior Publication Data

US 2008/0272669 A1    Nov. 6, 2008

(30) Foreign Application Priority Data

May 8, 2006 (DE) .................... 10 2006 021 354

(51) Int. Cl.
H02K 1/00 (2006.01)
(52) U.S. Cl. .................................................. 310/184
(58) Field of Classification Search .............. 310/184, 310/179, 180
See application file for complete search history.

(56) References Cited

U.S. PATENT DOCUMENTS 4,743,828 A    5/1988 Jahns
(Continued)

FOREIGN PATENT DOCUMENTS

DE    621 853 C    11/1935

(Continued)

*Primary Examiner*—Nguyen N Hanh
(74) *Attorney, Agent, or Firm*—Henry M. Feiereisen; Ursula B. Day

(57) ABSTRACT

The electrical machine (1) has a stator (2) and a rotor (5), wherein the stator (2) has stator slots (8), in which a stator winding (4) with redundant and at least three-phase winding systems (U1, V1, W1; U2, V2, W2) is laid. According to the invention, the electrical machine (1) has a large number of poles with a pole number (PZ) of at least four, a number (NZ) of stator slots (8) which corresponds to the product of a phase number and the square of the pole number (PZ) of the electrical machine (1) or an integral multiple thereof, and a number of winding systems (U1, V1, W1; . . . ; U4, V4, W4) which corresponds to the pole number (PZ). In each case a number of in-phase winding sections (U1-U4, V1-V4, W1-W4) which corresponds to the pole number (PZ) are combined to form a group of phase winding sections (PU, PV, PW). The phase winding section groups (PU, PV, PW) are laid, phase-cyclically and pole-for-pole, in the stator slots (8) of the stator (2). Depending on the pole and phase winding section group (PU, PV, PW), in each case are slot region (N1-N4) which corresponds to the pole number (PZ) is provided. The slot assignment takes place in such a way that the in-phase winding sections (U1-U4, V1-V4, W1-W4) are distributed, corresponding to their numbering, uniformly amongst the slot positions (N1, . . . , N4) of the associated slot regions (N1-N4).

17 Claims, 7 Drawing Sheets

U.S. PATENT DOCUMENTS

| | | |
|---|---|---|
| 4,859,885 A | 8/1989 | Kliman |
| 6,969,938 B2 * | 11/2005 | Seguchi .................... 310/184 |
| 2001/0010441 A1 * | 8/2001 | Luttrell .................... 310/184 |

FOREIGN PATENT DOCUMENTS

| | | |
|---|---|---|
| JP | 5146124 A | 6/1993 |
| RU | 2072606 C1 | 1/1997 |
| RU | 2224346 C2 | 2/2004 |
| RU | 2231891 C2 | 6/2004 |
| SU | 1603483 A1 | 10/1990 |
| WO | WO 84/03400 A1 | 8/1984 |
| WO | WO 02/15367 A1 | 2/2002 |

* cited by examiner

ELECTRICAL MACHINE, IN PARTICULAR A SYNCHRONOUS MOTOR, WITH REDUNDANT STATOR WINDINGS

BACKGROUND OF THE INVENTION

The invention relates to an electrical machine having a stator and a rotor, with the stator having stator slots in which a stator winding with redundant and at least three-phase winding systems is laid. The invention also relates to an electrical drive which has an electrical machine such as this and has a number of converters, corresponding to the number of poles in the electrical machine, for the electrical supply to the redundant and at least three-phase winding systems in the electrical machine.

Electrical machines such as these, in particular electric motors such as asynchronous motors or synchronous motors, are required for a wide range of drive functions, for example for driving compressors. Synchronous motors are advantageous to drive high-speed compressors. Synchronous motors are preferably in the form of two-pole, laminated or solid, solid-pole rotors or turbo-rotors.

The electrical machines mentioned above are preferably fed via one or more parallel-connected converters. In particular, the converter is a voltage intermediate-circuit converter for producing a three-phase or polyphase output voltage. The conversion is carried out via a voltage intermediate circuit with an energy storage capacitor. On the output side, the voltage intermediate circuit feeds a pulse-controlled inverter as part of the converter.

In certain fields of application, electrical drive redundancy may be required or even absolutely essential. In the case of an electrical drive of the type mentioned above, it is in principle possible to design the converters and/or the electrical machine redundantly. In the case of two-pole synchronous motors which are operated from a current intermediate-circuit converter, one known measure is to provide two winding systems or three-phase windings which are pivoted through 30° with respect to one another. The two winding systems are each fed from one converter.

By way of example, redundancy can be achieved on the converter side by providing a third converter which can replace a failed converter. Alternatively, the rating when there are only two converters may be designed such that, if one converter fails, the remaining converter can take over the entire feed required. A converter which is redundant in this way may be designed to be appropriately powerful. The expression "rating" normally relates to the maximum electrical power consumed during continuous operation.

If, in contrast, one of the winding systems on the motor side fails, for example as a result of a short, then only half the rating or half the torque of the electrical machine is then available, irrespective of the converter-side design.

In order to achieve converter-side and motor-side redundancy, it is disadvantageously necessary to design an electrical machine such as this from the rating point of view such that, if one of the two at least three-phase winding systems fails, the other winding system can carry all of the current for the full torque. In consequence, the electrical machine must be greatly over designed, with each of the winding systems carrying only half the maximum current during normal operation.

SUMMARY OF THE INVENTION

One object of the present invention is to specify an electrical machine with redundant winding systems, which needs to be over designed to a lesser extent and can therefore have a smaller physical size for the same electrical rating.

A further object of the invention is to specify a suitable electrical drive with a machine such as this.

This object is achieved by an electrical machine as claimed in claim 1 which has a stator with stator slots and a rotor, with redundant and at least three-phase winding systems being laid in the stator slots. Further embodiments are specified in the dependant claims 2 to 9. A suitable electrical drive with an electrical machine such as this is specified in claim 10. Claims 11 and 13 contain advantageous embodiments of the electrical machine.

According to the invention, the electrical machine has a multiplicity of poles, with the number of poles being at least four. Furthermore, the electrical machine has a number of stator slots corresponding to the product of the number of phases and the square of the number of poles or an integer multiple thereof. In most cases, the electrical machine is designed with three phases, that is to say the number of phases in the electrical machine is three. In consequence, a four-pole three-phase electrical machine has a total number of 48 slots or an integer multiple thereof.

Furthermore, the electrical machine has a number of winding systems or three-phase windings corresponding to the number of poles. A number of identical-phase winding sections corresponding to the number of poles are in each case combined to form in each case one phase winding-section group. These phase winding-section groups are laid cyclically phase-by-phase and pole-by-pole in the stator slots in the stator. A slot area which corresponds to the number of poles is in each case provided for each pole and phase winding-section group. The slots are filled such that the identical-phase winding sections are distributed uniformly, corresponding to their numbering, between the respective slots of the associated slot areas.

The slot filling according to the invention advantageously avoids phase offsets in the winding systems, which are laid parallel, for phase-synchronous current excitation by means of the converters. Phase offsets such as these are particularly critical when using voltage intermediate-circuit converters for the feed, particularly because of the increase in the electrical losses and harmonic components in the electrical machine.

If the current feed in the remaining winding systems is not changed when a failure occurs in one of the winding systems, not just half but ¾ of the rated torque is available with the present invention. ⅚ of the rated torque is available in an electrical machine whose number of poles is 6, and even ⅞ of the rated torque is available in an electrical machine whose number of poles is 8.

A further major advantage is that an electrical machine according to the invention can be made more compact. In particular, following a failure of one of the winding systems, the full rated power or the full rated torque is still available continuously if, in the case of a four-pole electrical machine, this machine is over designed by just ⅓ in terms of the technical design of the winding systems, with the current excitation being increased in the remaining winding systems.

In contrast, the power winding for a two-pole electrical machine according to the prior art must be over designed by a factor of two.

A further advantage is that, even in the case of an electrical machine with only four poles, if a further winding system fails or even a third winding system, at least emergency operation is still possible even though, in this situation, the full rating or the full rated torque is generally no longer available.

In contrast, if the second winding system in the already described two-pole electrical machine fails, no further operation is possible at all, and in particular even no emergency operation.

In one embodiment of the invention, the identical-phase winding sections are interchanged cyclically pole-by-pole, corresponding to their numbering. The cyclic interchanging results in the previously described uniform distribution of the identical-phase winding sections along the internal circumference of the stator. Cyclic interchanging ensures uniform distribution of the winding sections in the slots provided for them.

Alternatively, according to a further embodiment of the invention, the slots are filled with identical-phase winding sections such that they differ by a maximum of two slot positions from pole-to-pole, corresponding to their numbering. This results in the identical-phase winding sections being distributed even more uniformly over the intended slot area. In comparison to the previous slot filling, the situation in which the slot position changes suddenly between two poles does not occur. The maximum step width corresponds to the number of poles in the electrical machine minus the value 1.

According to a further embodiment, the stator has a two-layer winding with an upper winding layer and a lower winding layer. The upper and the lower winding layer are offset with respect to one another by one winding pitch.

In one particular embodiment, the electrical machine is a synchronous machine, in particular a synchronous motor. The synchronous motor may have a rotor winding for magnetic field production, or alternatively may have permanent-magnetic excitation.

The laying of the redundant winding systems according to the invention and the slot filling are also advantageous for an asynchronous machine, in particular for an asynchronous motor.

In particular, the electrical machine is a large machine with a weighting of at least 10 kW, in particular of at least 1 MW. In principle, the redundant winding systems according to the invention can also be laid in electrical machines whose rating is lower.

According to one particularly advantageous embodiment of the invention, the redundant and at least three-phase winding systems which are laid in the stator slots are electrically designed such that the electrical machine can still be operated at its rating or its rated torque in the event of failure of or lack of feed to one of the winding systems. In this case, as described above, the stator current in the remaining winding systems must be increased such that the maximum rating and the maximum rated torque of the electrical machine are available.

The electrical machine is preferably a four-pole machine which has four redundant three-phase winding systems laid in the stator slots.

The object of the invention is also achieved by an electrical drive which has an electrical machine according to the invention as well as at least one converter for the electrical supply to the redundant and at least three-phase winding system in the electrical machine.

A drive such as this is physically smaller than drives according to the prior art.

This is associated with the advantage that, if one converter fails, the remaining converters can take over the electrical supply for the winding systems. In this case, the electrical power section of the converters in the electrical machine must be designed to produce a stronger output current. In the case of a four-pole electrical machine the power section must be designed for an output current increased by about ⅓.

In particular, the converters can be operated locked in phase to one another. This makes it easier to control the converters.

According to one preferred embodiment, the converters are frequency converters so that the rotation speed of the electrical machine and in consequence also the rotation speed of a driven component, for example a compressor unit, can be made variable.

BRIEF DESCRIPTION OF THE DRAWING

Further advantageous characteristics of the invention will become evident from their explanation, by way of example, with reference to the FIGS., in which.

DETAILED DESCRIPTION OF PREFERRED EMBODIMENTS

Figure 1:
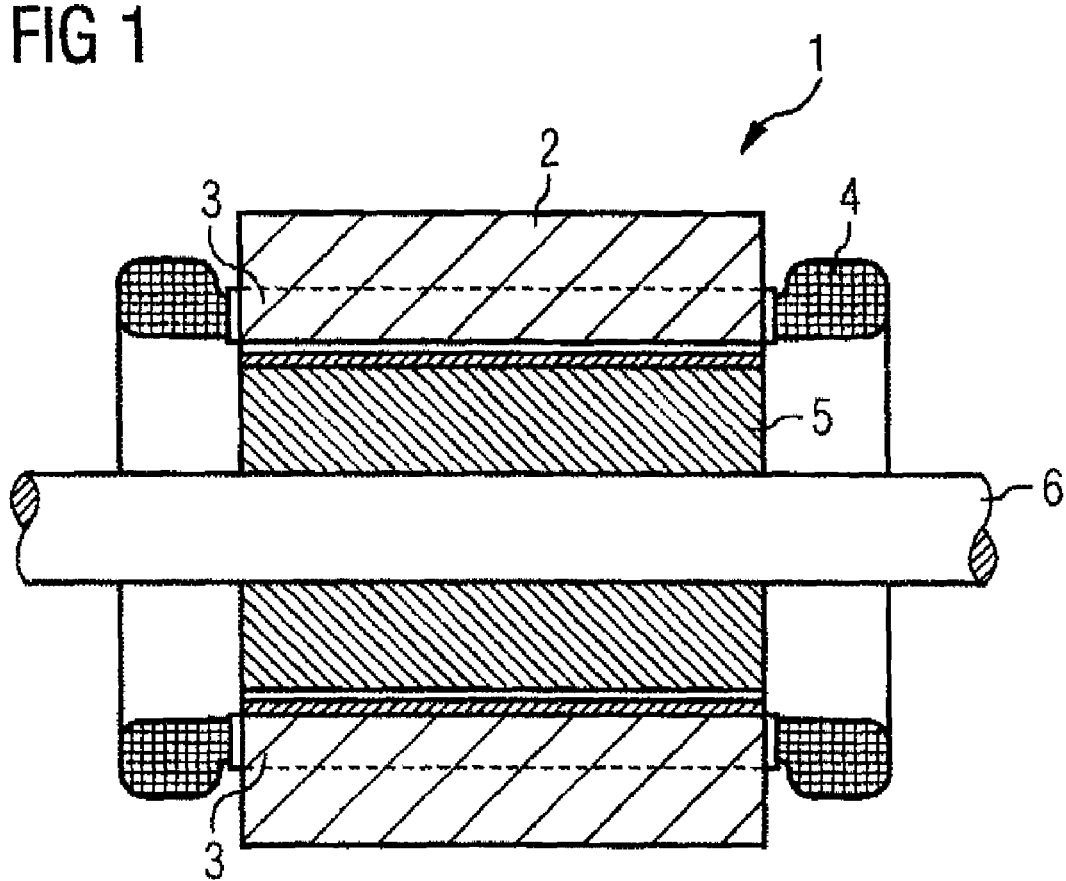
FIG. 1 shows a longitudinal section through an electrical machine according to the prior art, along its rotation axis.

FIG. 1 shows a longitudinal section through an electrical machine 1 according to the prior art, along its rotation axis. The electrical machine 1 has a stator 2 and a rotor 5 which is mounted about its rotation axis. The stator 2 has a stator core 3 with a stator winding 4 for production of a rotating magnetic field. The stator winding 4 has polyphase, in particular three-phase, winding systems, which are not illustrated in any more detail. Normally, the stator core 3 and possibly the rotor core are laminated, in order to reduce eddy-current losses. The reference symbol 6 denotes a rotor shaft as part of the rotor 5.

Figure 2:
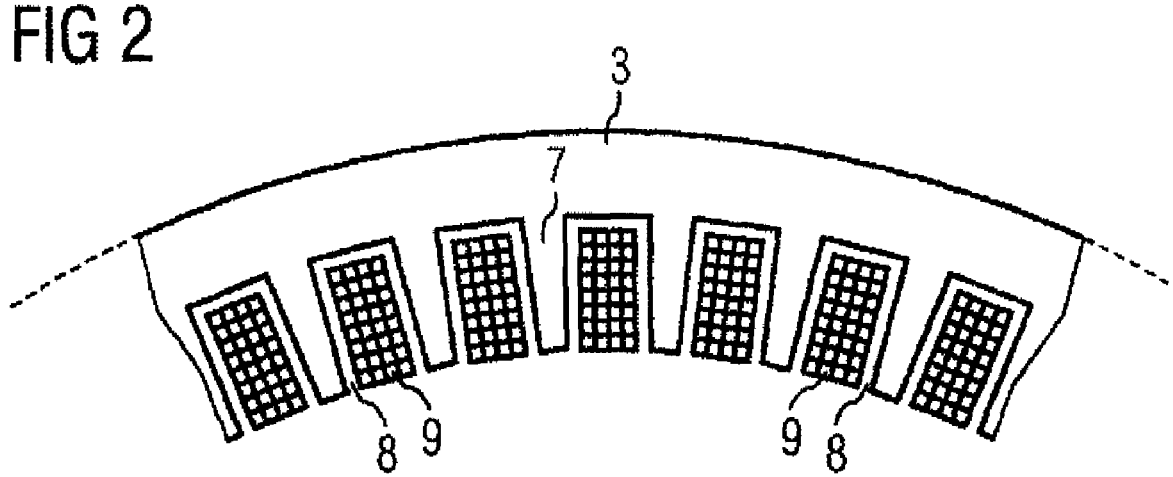
FIG. 2 shows a detail of a laminate of a stator core of an electrical machine according to the invention.

FIG. 2 shows a detail of a laminate of a stator core 3 of an electrical machine according to the invention. The electrical machine may be an electric motor or a generator. The electrical machine may be a synchronous machine or an asynchronous machine. In particular, the electrical machine is a large machine with a rating of at least 10 kW, in particular with a rating of at least 1 MW. The large electrical machine may also have an electrical rating of several 100 kW.

The laminate has teeth 7 and slots, or stator slots 8, in which the winding sections 9 of the winding systems of the electrical machine are laid. The example in FIG. 2 shows a detail of only seven slots 8 of the total of 48 slots 8 in a four-pole three-phase electrical machine with four redundant winding systems. According to the invention, the number of stator slots 8 corresponds to the product of the number of phases and the square of the number of poles in the electrical machine.

According to the invention, the number of winding systems corresponds to the number of poles in the electrical machine. In the present example, the electrical machine has four winding systems.

Figure 3:
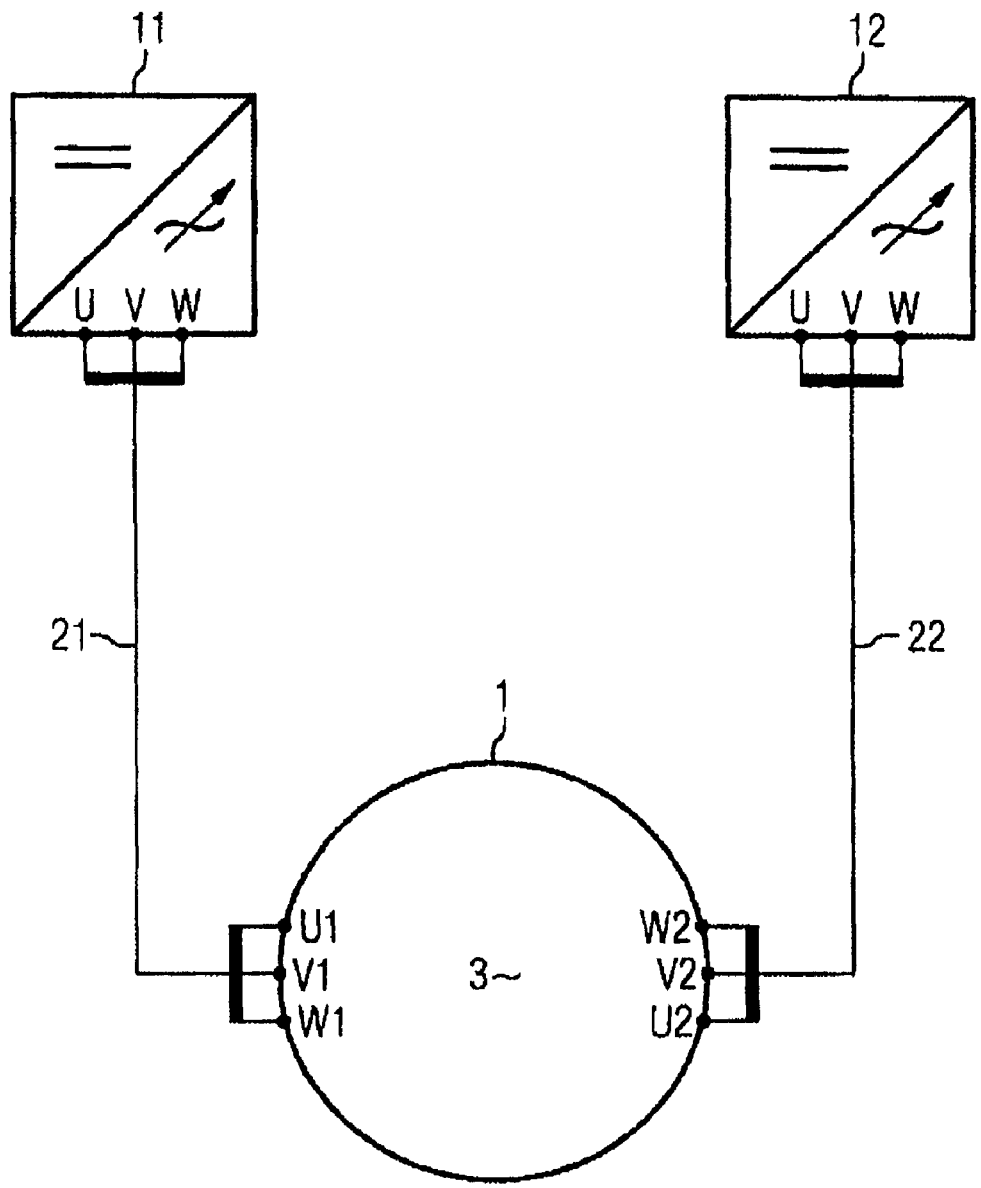
FIG. 3 shows an electrical drive with a two-pole three-phase electrical machine with redundant winding systems according to the prior art, and with two converters for the electrical supply of the two winding systems.

FIG. 3 shows an electrical drive with a two-pole electrical machine 1 with redundant winding systems according to the prior art, and with two converters 11, 12 for the electrical supply for the two winding systems. By way of example, the two converters 11, 12 are pulse-controlled inverters, which produce a three-phase AC voltage at the outputs U, V, W from a DC voltage on the input side. The two pulse-controlled inverters 11, 12 are operated locked in phase to one another. The outputs U, V, W correspond to the respective phases U, V, W of the converters 11, 12. The wave symbol with an arrow in the symbolically illustrated box for a converter 11, 12 indicates that the pulse-controlled inverter is a frequency converter for possible production of a variable-frequency three-phase AC voltage. The outputs U, V, W of each converter 11, 12 are connected by a respective three-phase supply line 21, 22 to an associated three-phase winding system U1, V1, W1; U2, V2, W2. As already described in the introduction, only about half the rated power or rated torque is available following failure of one of the two winding systems U1, V1, W1; U2, V2, W2.

Figure 4:
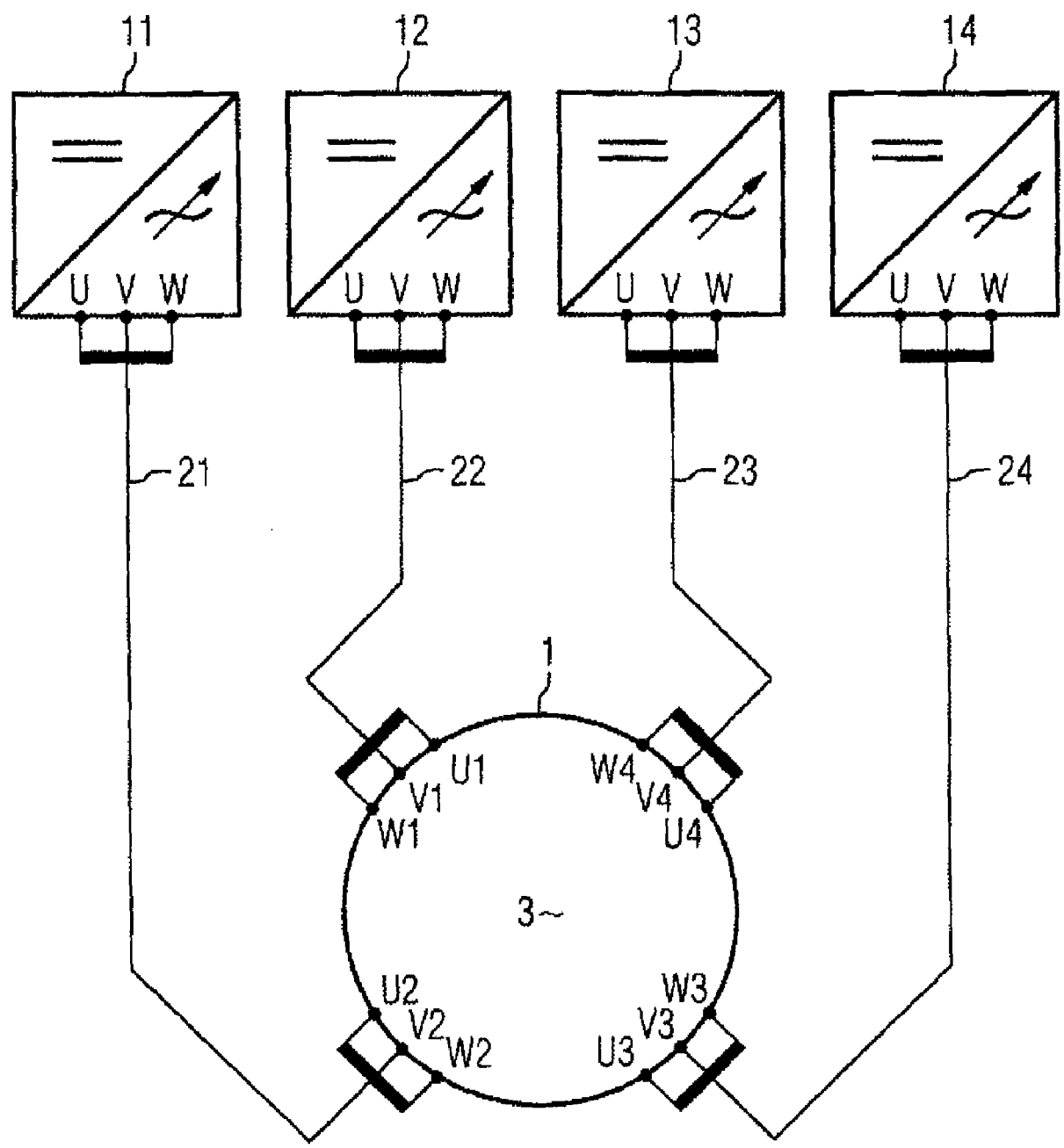
FIG. 4 shows an electrical drive with a three-phase electrical machine, having four poles by way of example, with four redundant winding systems and, for example, with four converters for the electrical supply of the four winding systems according to the invention.

FIG. 4 shows an electrical drive having, for example, a four-pole three-phase electrical machine 1 with four redundant three-phase winding systems U1, V1, W1; . . . ; U4, V4, W4 and, for example, with four converters 11 to 14 for the electrical supply for the four winding systems U1, V1, W1; . . . ; U4, V4, W4.

The four redundant and three-phase winding systems U1, V1, W1; . . . ; U4, V4, W4 are laid in the stator slots 8 in the electrical machine 1. In particular, the redundant and at least three-phase winding systems U1, V1, W1; . . . ; U4, V4, W4 are electrically designed such that the electrical machine 1 can still be operated at its rating or with its rated torque in the event of failure or if one winding system U1, V1, W1; . . . ; U4, V4, W4 is not being fed.

In general, the electrical drive has at least a number of converters 11 to 14 corresponding to the number of poles PZ in the electrical machine 1 for the electrical supply for the redundant and at least three-phase winding systems U1, V1, W1; . . . ; U4, V4, W4 in the electrical machine 1. At least one converter 11 to 14 is required for the electrical supply for the redundant and at least three-phase winding systems U1, V1, W1; . . . ; U4, V4, W4. The electrical machine 1 shown in FIG. 4 may alternatively have an even number of poles, that is to say 6, 8, 10 or more. The number of phases in the electrical machine 1 may be 4, 5, 6 or more.

The converters 11 to 14 are preferably pulse-controlled inverters or frequency converters for producing an at least three-phase AC voltage at the outputs U, V, W. The converters 11 to 14 (in the example in FIG. 4 these are the four illustrated pulse-controlled inverters 11 to 14) are operated locked in phase or synchronized in phase to one another. The output U, V, W of each converter 11 to 14 is connected via a respective three-phase supply line 21 to 24 to an associated three-phase winding system U1, V1, W1; . . . ; U4, V4, W4. As already described in the introduction, approximately ¾ of the rating and approximately ¾ of the rated torque are advantageously still available after failure of one of the four winding systems U1, V1, W1; U2, V2, W2.

Figure 5:
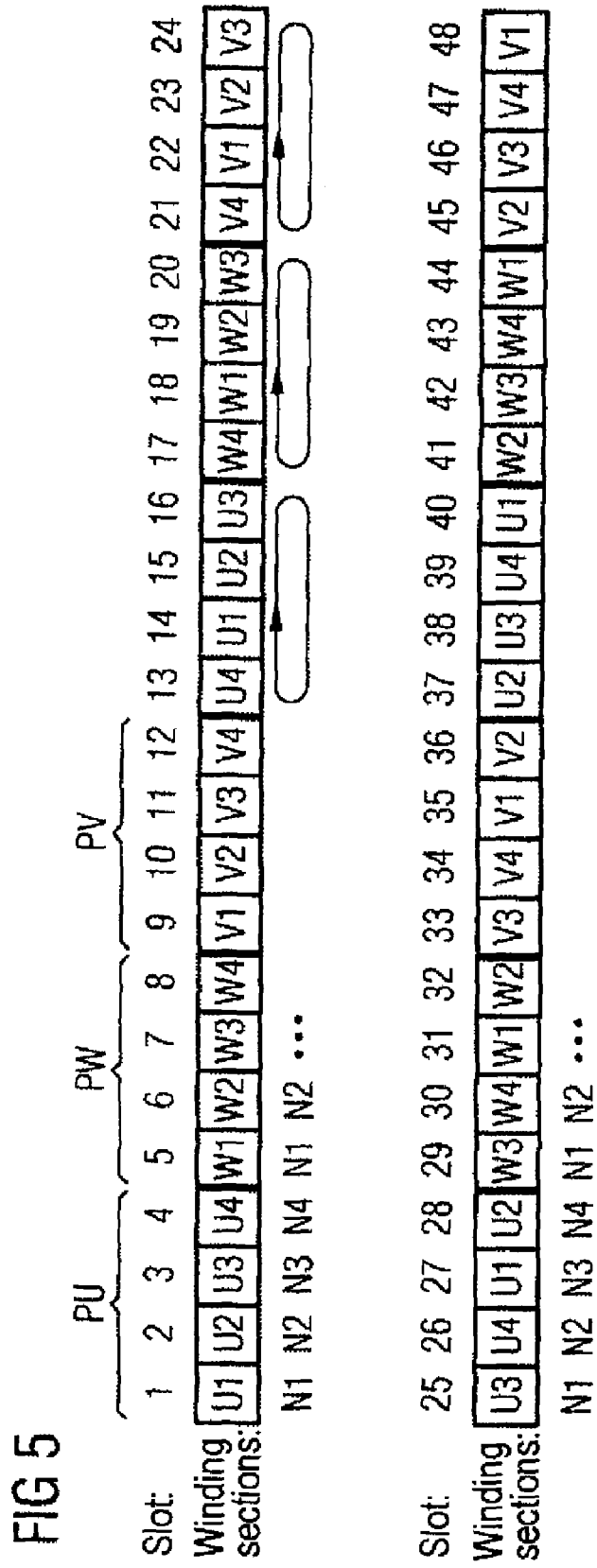
FIG. 5 shows, by way of example, a first slot filling plan with a single winding layer for the case of a four-pole three-phase electrical machine according to the invention.

By way of example, FIG. 5 shows a first slot filling plan with a single winding layer for a four-pole three-phase electrical machine. According to the invention, the electrical machine has a number NZ of stator slots, corresponding to the product of the number of phases and the square of the number of poles PZ, or a multiple thereof. In the illustrated case, the number NZ of stator slots is 48. Integer multiples of this number, for example 96 or 144, are likewise possible. According to the invention, the electrical machine has a number of poles PZ corresponding to the number of winding systems U1, V1, W1; . . . ; U4, V4, W4. In the example shown in FIG. 5, there are four winding systems U1, V1, W1; . . . ; U4, V4, W4.

As the present FIG. 5 shows, a number of identical-phase winding sections U1-U4, V1-V4, W1-W4 corresponding to the number of poles PZ are combined according to the invention to form a respective phase winding-section group PU, PV, PW. In a corresponding manner to the sequential numbering of the stator slots from 1 to 48, the four identical-phase winding sections U1-U4 belong to the phase winding-section group PU, the four identical-phase winding sections V1-V4 to the phase winding-section group PV, and the four identical-phase winding sections W1-W4 to the phase winding section group PW.

Furthermore, according to the invention, the phase winding-section groups PU, PV, PW are laid cyclically in phase and pole-by-pole in the stator slots in the stator. In the example in the present FIG. 5, the phase winding section group PU fills the slot 1 to 4, 13 to 16, 25 to 28 and 37 to 40, corresponding to the number of poles PZ=4 in the electrical machine. The two phase winding-section groups PV and PW are arranged offset through 8 or 4 slots, respectively, with respect to the phase winding-section group PU.

According to the invention, a slot area N1-N4 corresponding to the number of poles PZ is in each case provided for each pole and phase winding-section group PU, PV, PW. In the present example in FIG. 5, a phase winding-section group PU, PV, PW fills a slot area comprising four slots. The stator slots are numbered successively and cyclically corresponding to the number of poles in the electrical machine, to be precise in a sequence N1, N2, N3, N4, N1, N2, . . . that is to say corresponding to the modulo of the number of poles of the electrical machine.

Finally, according to the invention, the slots are filled such that the identical-phase winding sections U1-U4, V1-V4, W1-W4 are distributed corresponding to their number uniformly between the respective slots and slot positions N1, . . . , N4 in the associated slot areas N1-N4. This will be explained using the present example in FIG. 5 for a single winding section U1 in the phase group PU. Accordingly, for the first pole, the winding section U1 fills the slot 1 at a slot position N1, fills the slot 14 at a slot position N2 for the second pole, fills the slot 27 at a slot position N3 for the third pole, and finally fills the slot 40 at a slot position N4 for the third pole. All the slot positions N1, . . . , N4 in a slot area N1-N4 are therefore filled in a uniformly distributed manner by the winding section U1 of the phase group PU.

According to one embodiment of the invention as shown in the example in the present FIG. 5, the identical-phase winding sections U1-V4, V1-V4, W1-W4 are interchanged cyclically from pole-to-pole, corresponding to their numbering. This is symbolized in FIG. 5 by the elongated circle, each with a direction arrow indicating the cyclic interchanging direction.

Figure 6:
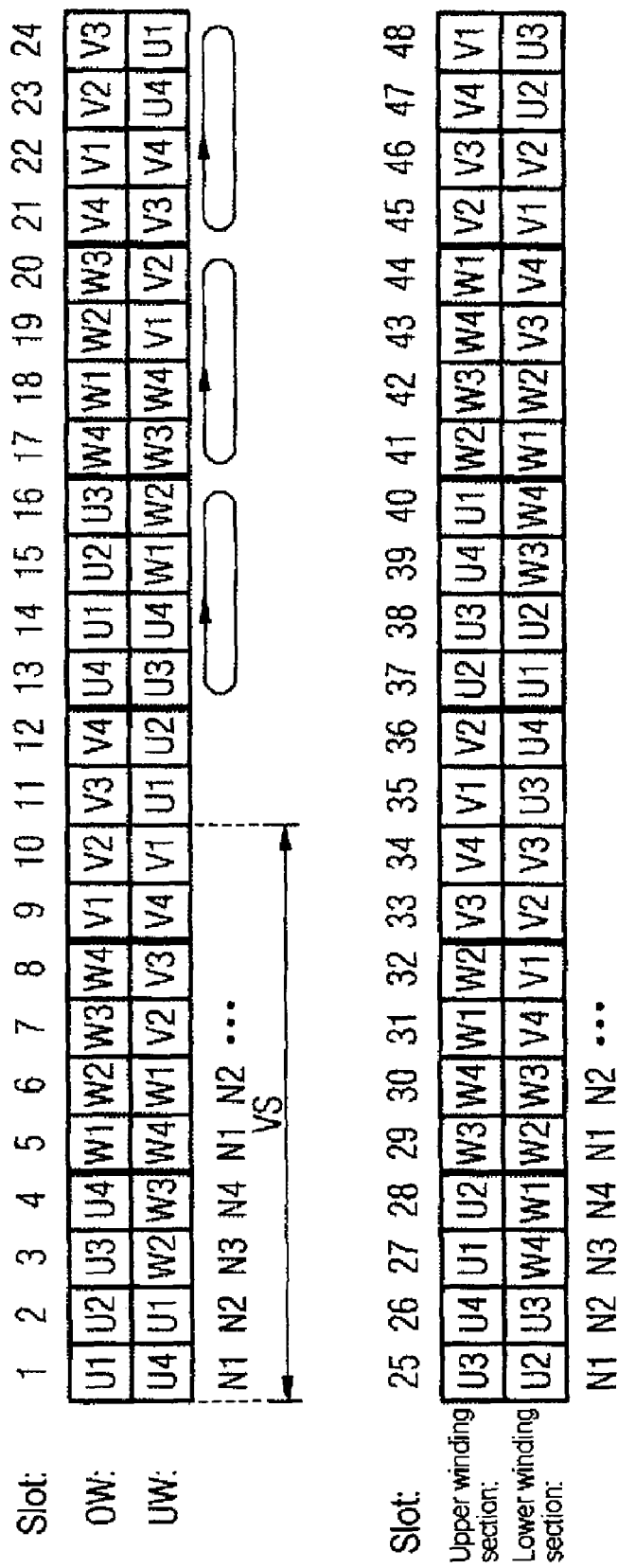
FIG. 6 shows, by way of example, a second slot filling plan with an upper and a lower winding layer according to the invention which are offset with respect to one another by one winding pitch.

By way of example, FIG. 6 shows a second slot filling plan with an upper and a lower winding layer OW, UW, which are offset by one winding pitch VS according to the invention. The slot filling in the upper winding layer OW corresponds to the slot filling shown in the previous FIG. 5. This second, that is to say the lower, winding layer UW is offset by, for example, 10 slots with respect to the upper winding layer OW.

Figure 7:
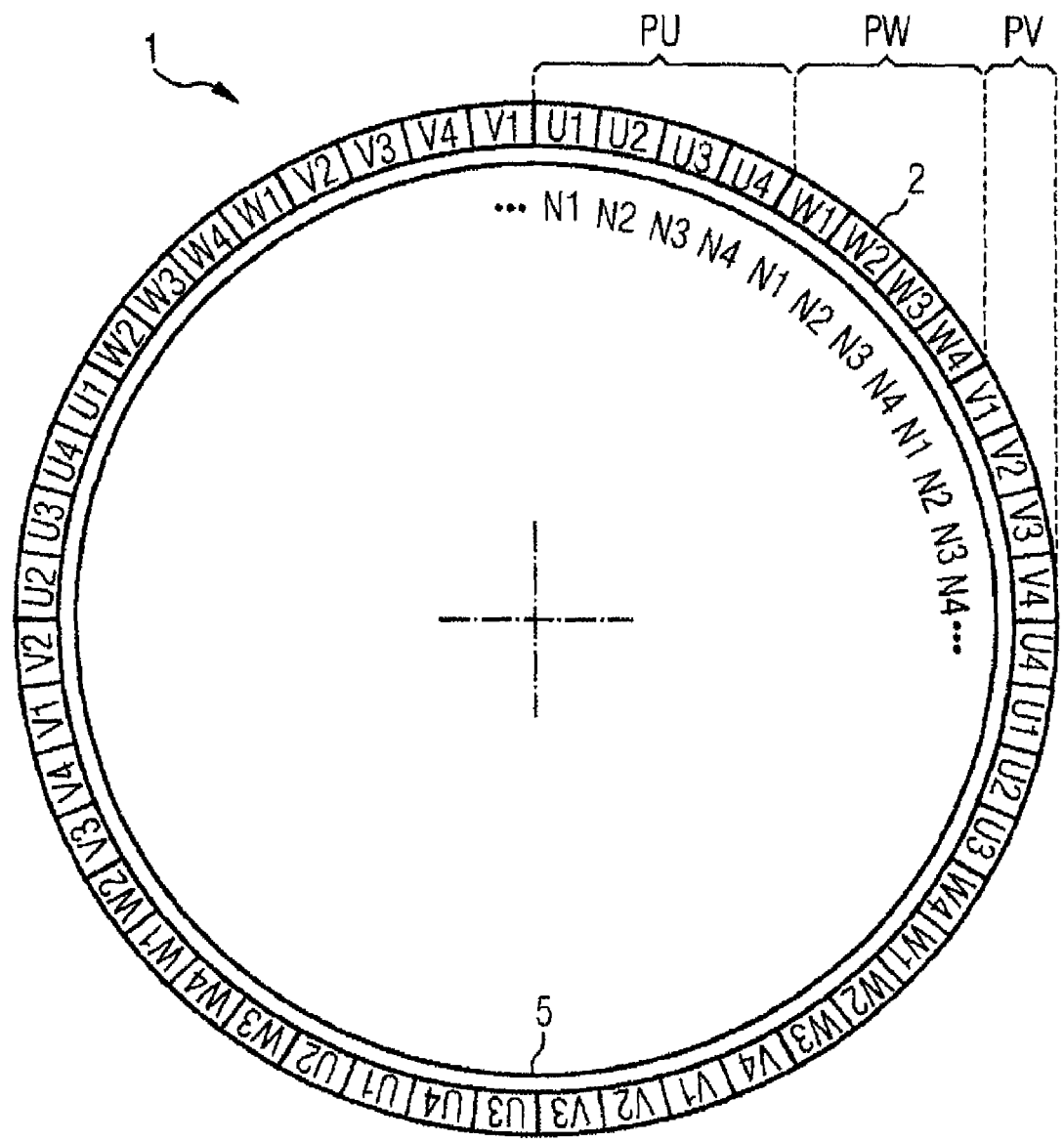
FIG. 7 shows a cross section through an electrical machine with the slot filling shown in FIG. 5.

FIG. 7 shows a cross section through an electrical machine 1 with the slots filled as shown in FIG. 5. The present FIG. 7 once again shows the cyclic uniform distribution of identical-phase winding sections U1-U4, V1-V4, W1-W4 between the respective slots and slot positions N1, . . . , N4 in the associated slot areas N1-N4, in order to assist understanding. The illustration corresponds to their actual spatial arrangement in the internal circumference of the stator 2 of the electrical machine 1.

Figure 8:
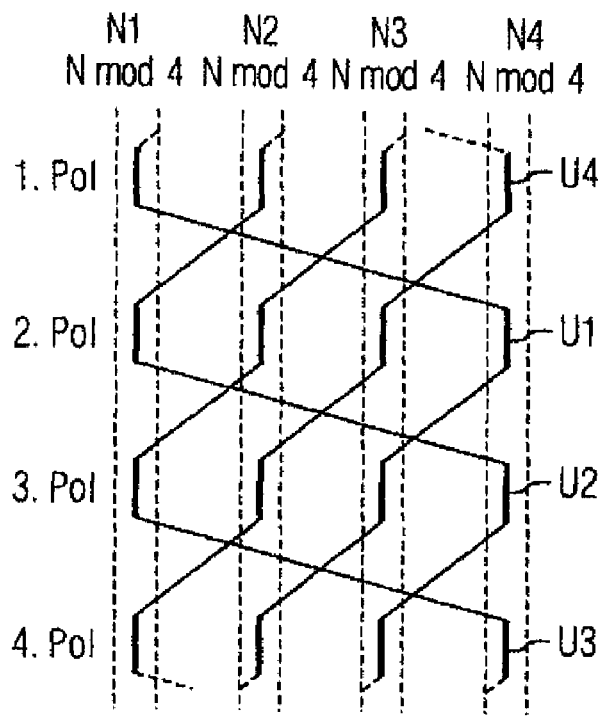
FIG. 8 shows, schematically, the distribution of identical-phase winding sections in the slots of the associated slot areas, corresponding to their numbering and pole-by-pole, according to the invention.

FIG. 8 shows, schematically, the distribution of the identical-phase winding sections U1-U4, V1-V4, W1-W4 corresponding to their numbering and pole-by-pole between the slots N1, . . . , N4 of the associated slot areas N1-N4.

The example in FIG. 8 shows the distribution of the identical-phase winding sections U1-U4, V1-V4, W1-W4 using the example of the identical-phase winding sections U1-U4 for the phase U. The two remaining phases V, W are distributed offset respectively by four and eight slots along the internal circumference of the stator of the electrical machine. Running from top to bottom, the example in FIG. 8 illustrates the respective slot positions of the identical-phase winding sections U1-U4 from the first pole to the fourth pole. The fourth pole is in turn followed by the first pole. FIG. 8 in each case shows identical slot positions N1, . . . , N4 for possible filling of the parallel identical-phase winding sections U1-U4 in each case vertically and by dashed lines. Vertical lines in bold indicate the filling of one of the identical-phase winding sections U1-U4 in the corresponding slot positions N1, . . . , N4. The transversely running thin lines show the connection of the identical-phase winding sections U1-U4 at the end of an end winding.

By way of example, the slots are filled in the same sense as the slot filling shown in FIG. 5. This illustration is intended to show that a slot filling in the opposite sense to this is also always possible for one possible slot filling, in the sense of the rotation direction of the current-excited rotating field.

According to the invention, the slots are filled in such a way that the identical-phase winding sections U1-U4 are distributed uniformly in accordance with their numbering over the slot positions N1, . . . , N4 of the associated slot areas N1-N4.

In the example shown in FIG. 8, by way of example, the winding section U1 for the first pole occupies the slot position N1, that is to say the first slot position N1 within the slot area N1-N4. The first position N1 follows in accordance with the mathematical modulo function from the rest of the division from the current sequential slot number and the value 4, which corresponds to the pole number.

The winding section U1 for the second pole, for example, occupies the slot position N4 in accordance with the modulo function N4=16 mod 4, with the number 16 corresponding to the sequential slot number. In order to assist understanding, the more familiar sequence 1-2-3-4-1- . . . has been chosen rather than the actual mathematical modulo sequence 0-1-2-3-0-1 . . . , with the slot position N4 corresponding to the actual mathematically correct slot position N0.

The winding section U1 for the third pole occupies the slot position N3 in accordance with the modulo function N3=27 mod 4, with the number 27 corresponding to the sequential slot number.

The winding section U1 for the fourth pole occupies the slot position N2 in accordance with the modulo function N2=38 mod 4, with the number 38 corresponding to the sequential slot number.

Figure 9:
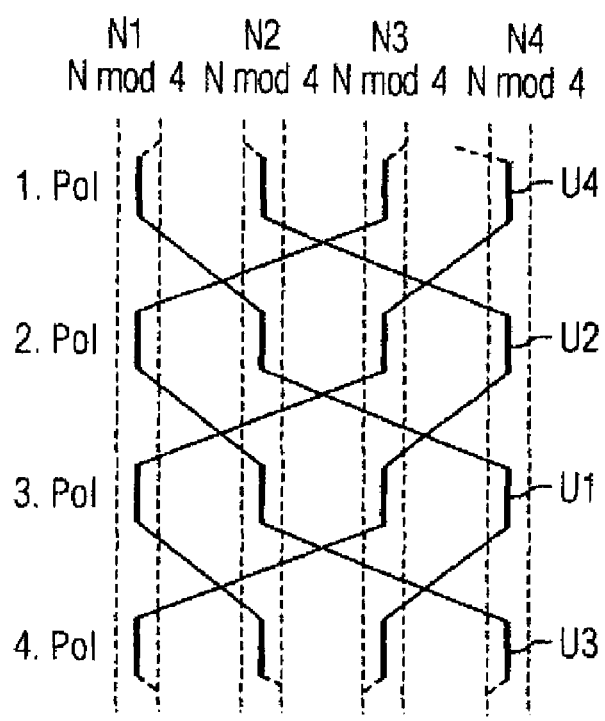
FIG. 9 shows, schematically, the distribution of identical-phase winding sections between the slots in the associated slot areas, corresponding to their numbering and pole-by-pole, according to one alternative embodiment relating to FIG. 8.

FIG. 9 shows, schematically, the distribution of the identical-phase winding sections U1-U4, V1-V4, W1-W4 corresponding to their numbering and pole-by-pole over the slot positions N1, . . . , N4 of the associated slot areas N1-N4 according to one alternative embodiment to that shown in FIG. 8.

The example in FIG. 9 once again shows the distribution of the identical-phase winding sections using the example of the identical-phase winding sections U1-U4 for the phase U. The two remaining phases V, W are distributed offset respectively by four and eight slots along the internal circumference of the stator of the electrical machine.

The distribution shown in FIG. 8 differs from the distribution of the individual winding sections U1-U4 in that the slot filling differs by a maximum of two slot positions from pole-to-pole. In this sense, the distribution in the circumferential direction of the stator is more uniform.

In comparison to this, the slot position of the winding section U1 from the first pole to the second pole in each case changes by 3 slot positions. With the slot filling shown in FIG. 8, the step width increases with the number of poles in the electrical machine, while the step width remains restricted to a maximum of 2 with the slot filling shown in FIG. 9.

In summary, the electrical machine 1 has a stator 2 and a rotor 5, with the stator 2 having stator slots 8 in which a stator winding 4 with redundant at least three-phase winding sections is laid U1, V1, W1; U2, V2, W2. According to the invention, the electrical machine 1 has a multiplicity of poles, with the number of poles PZ being at least four. The electrical machine 1 has a number NZ of stator slots 8 which corresponds to the product of the number of phases and the square of the number of poles PZ, or an integer multiple thereof. Furthermore, the electrical machine has a number of at least three-phase winding systems U1, V1, W1; . . . ; U4, V4, W4 corresponding to the number of poles PZ. In each case one of the number of identical-phase winding sections U1-U4, V1-V4, W1-W4 corresponding to the number of poles PZ is in each case combined to form a phase winding-section group PU, PV, PW. The phase winding-section groups PU, PV, PW are laid cyclically in phase and pole-by-pole in the stator slots 8 in the stator 2. A slot area N1-N4 corresponding to the number of poles PZ is provided for each pole and phase winding-section group PU, PV, PW, and the slots are filled such that the identical-phase winding sections U1-U4, V1-V4, W1-W4 are distributed uniformly, corresponding to their numbering, over the slot positions N1, . . . , N4 of the associated slot areas N1-N4.

The invention relates to an electrical drive which has an electrical machine 1 such as this as well as at least one converter 11-14 for the electrical supply for the redundant and at least three-phase winding systems 4 in the electrical machine 1.

What is claimed is:

1. An electric machine having a predetermined number of poles, the machine comprising:
a rotor, and
a stator having a defined number of stator slots with a stator winding which has a predetermined number of redundant winding systems with at least three phases, the number of redundant winding systems corresponding to the number of poles, wherein winding sections having an identical phase are combined to form a single phase-winding group, with the phase-winding groups being inserted in the stator slots of the poles cyclically according to their phase, wherein a slot area corresponding to the number of poles is associated with each pole and phase-winding group, wherein the defined number of stator slots corresponds to a product of the number of phases and the square of the number of poles, or an integer multiple of the product, and wherein the winding sections of a phase-winding group having an identical phase are distributed uniformly and in a predefined order over the slot positions of the slot areas associated with that phase.

2. The electric machine of claim 1, wherein the winding sections of a phase-winding group having an identical phase are distributed from one pole to an adjacent pole in a cyclically permutated order.

3. The electric machine of claim 1, wherein the winding sections of a phase-winding group having an identical phase are distributed such that they differ from one pole to an adjacent pole by at most two slot positions.

4. The electric machine of claim 1, wherein the stator winding is a two-layer winding with an upper winding layer and a lower winding layer, and wherein the upper winding layer is offset with respect to the lower winding layer by a winding pitch.

5. The electric machine of claim 1, wherein the electric machine is a synchronous machine.

6. The electric machine of claim 5, wherein the synchronous machine is a synchronous motor.

7. The electric machine of claim 1, wherein the electric machine is an electric motor.

8. The electric machine of claim 1, wherein the electric machine is an asynchronous machine.

9. The electric machine of claim 8, wherein the asynchronous machine is an asynchronous motor.

10. The electric machine of claim 1, wherein the electric machine has a power rating of at least 10 kW.

11. The electric machine of claim 1, wherein the electric machine has a power rating of at least 1 MW.

12. The electric machine of claim 1, wherein the winding systems are electrically configured such that the electric machine is capable of operating at its rated power or its rated torque even if one of the winding systems fails or loses power.

13. The electric machine of claim 1, wherein the electric machine is a four-pole machine comprising four redundant three-phase winding systems.

14. An electric drive comprising an electric machine of claim 1, and at least one converter for supplying electric power to the redundant winding systems with the at least three-phases.

15. The electric drive of claim 14, comprising a plurality of converters corresponding at least to the number of poles of the electric machine for supplying electric power to the redundant winding systems with the at least three-phases.

16. The electric drive of claim 15, wherein the plurality of converters are phase-locked to one another.

17. The electric drive of claim 14, wherein the at least one converter is a frequency converter.

* * * * *